3,794,515
SARAN COATING OF CELLULOSIC CASING
Albin F. Turbak and Henry J. Rose, Danville, Ill.,
assignors to Tee-Pak, Inc., Chicago, Ill.
No Drawing. Filed Apr. 3, 1968, Ser. No. 718,343
Int. Cl. B32b 23/08
U.S. Cl. 117—145                                                    9 Claims

ABSTRACT OF THE DISCLOSURE

An oxygen- and water vapor impermeable food casing is prepared by coating a regenerated cellulose or fiber reinforced regenerated cellulose food casing with a coating composition comprising a saran, a plasticizer, a polymeric polyisocyanate, an activator, such as a polyol or reaction product of a polyol with ethlene oxide or the like, and a solvent system comprising a high boiling solvent, such as buytrolactone, and a low boiling solvent such as methyl ethyl ketone or tetrahydrofuran. The coated casing is heated to dry and cure the coating thereon. The coating composition is self-priming and forms a more adherent coating having an oxygen- and vapor permeability less than about 1.0 cc./100 in.$^2$/24 hr.-atm.

BACKGROUND OF THE INVENTION

This invention relates to the coating of cellulosic sausage casing with saran for use in processing of liverwurst sausages and the like.

Regenerated cellulose casings, particularly in seamless tubular form, are widely used for a great variety of meat products including meat loaf items, hams, bologna, wieners, and the like, because of their high permeability to smoke and moisture. However, due to high moisture-vapor permeability, regenerated cellulose casings are not entirely satisfactory for use with those meat products which must retain a high moisture content or which change color on prolonged exposure to the atmosphere. In this connection, it has not been found entirely satisfactory to package such products as liverwurst and the like by encasing the same in regenerated cellulose, for the reason that on storage, excessive dehydration and objectionable color changes (greening) take place in the meat, frequently resulting in unsalable products.

The previous attempts at the use of a moisture and air impervious film material such as varnishes, etc., on such items, while somewhat eliminating the dehydration problem associated with regenerated cellulose encasing materials, were unsatisfactory because they did not prevent the phenomenon of liverwurst greening sufficiently. Thus, numerous types of coated cellulosic casings have been developed but has not been completely satisfactory.

Coated film materials such as coated tubular cellulosic sausage casings may be produced in accordance with modifications of the teachings of U.S. Pats. 2,627,471 and 2,627,483. Coated cellulosic sausage casings have also been produced (see U.S. Pat. 3,005,728) by applying to the surface of a regenerated cellulose tubing a thin coating of a diisocyanate, followed by the application of an overcoating of saran. The two-coat system has also suffered numerous technical disadvantages; e.g., weak casing, poor ink adhesion thereto and high cost.

With the possible exception of the aforementioned patents, neither waxing, varnishing or lacquering regenerated cellulose film as taught by the prior art has resulted in a practical casing material for processing liverwurst for a variety of technical reasons, an important one being that the adhesive characteristics of the materials used are inadequate to satisfy the functional requirements of such casing. For example, with lacquered regenerated cellulose casings, moisture egress will frequently cause said coating to peel off of the regenerated cellulose casing. A commercially practical coated casing must not only withstand moisture-vapor permeation through the casing, but concurrently the surface coating must not peel or crack, in the presence or absence of water and must be able to stretch and shrink at the same rate as the regenerated cellulose component of the casing, particularly when subjected to hot water cooking during processing. The two-coat method previously mentioned does withstand cooking conditions, but is costly, time-consuming, and gives relatively poor ink adhesion and physical properties such as burst strength to the casing.

STATEMENT OF OBJECTS AND FEATURES

It is an object of this invention to produce an improved coated cellulosic casing or other packaging film.

Another object of this invention is to produce an improved saran coated cellulosic casing or other film having improved physical properties such as burst strength and ink adhesion.

Still another object of this invention is to produce a saran coated cellulosic casing or other film having improved glossiness.

Yet another object of this invention is to produce a cheaper saran coated cellulosic casing.

A feature of this invention is a regenerated cellulose casing or other food packaging material coated with an improved self-priming coating composition comprising a plasticizer, a saran resin, a polymeric polyisocyanate and a solvent system.

Another feature of this invention is a regenerated cellulos casing or other food packaging material coated with an improved self-priming coating composition, which composition includes a saran resin, a plasticizer, a polymeric polyisocyanate, and a solvent system including a relatively high boiling solvent.

Still another feature of this invention is a regenerated cellulose casing or other food packaging material coated with an improved self-priming coating composition, which composition includes a saran resin, a plasticizer, a polymeric polyisocyanate, an activator and a solvent system.

Yet another feature of this invention is a method for producing a casing (or other food packaging material) by applying to the surface of regenerated cellulose tubing a self-priming coating composition including a saran resin, a plasticizer, an activator, a polymeric polyisocyanate, and a solvent system, and curing the coated casing.

Still another feature of this invention is the provisions of a new and improved coating composition including a saran resin, a plasticizer, a polymeric polyisocyanate, and a solvent system.

Other objects and features of this invention will become apparent from time to time throughout the specfication and claims as hereinafter related.

SUMMARY OF THE INVENTION

In accordance with this invention, it has been discovered that an improved saran coated, moisture-impermeable, sausage casing or other food packaging film can be produced with a self-priming (one-coat) lacquer or coating composition, which includes a saran resin, a plasticizer, a polymreic polyisocyanate, an activator, and a solvent system, the solvent system preferably including a relatively high boiling solvent. The casing is coated and then cured as by heating to produce a saran coated casing having improved physical properties (e.g. low moisture-vapor permeability), at a lower cost and with a reduction in manufacturing time.

DESCRIPTION OF THE PREFERRED EMBODIMENTS

In the manufacture of cellulosic meat casings, viscose is extruded through an annular die at a linear rate of 15–75 feet per minute into a coagulating and regenerating bath usually consisting of ammonium sulfate, sodium sulfate, and sulfuric acid. In most cases, the viscose is extruded first into a coagulating bath of ammonium sulfate and a small amount of sulfuric acid and then into a regenerating bath containing a higher proportion of sulfuric acid. The cellulosic tube which is formed is continuously removed and washed to remove reactants from the coagulating and/or regenerating bath and by-products which are formed during the regeneration of the cellulose.

When a fibrous casing is manufactured, the system is modified to insert a fibrous paper, preferably a long fiber hemp paper, into the casing. The fibrous paper is continuously formed into a tube and passed through a die having an annular orifice which extrudes viscose to impregnate and coat the paper. The impregnated and coated paper is then passed through a coagulating and regenerating bath to produce a paper-reinforced casing which consists of about 35–40% paper and 60–65% regenerated cellulose and softening or plasticizing ingredients (e.g. glycerin and water). In the production of both clear (unreinforced) casings and fibrous casings, one or more of the wash baths following the coagulating and regenerating baths is provided with glycerin or other suitable plasticizing ingredients to soften the regenerated cellulose product. After leaving the plasticizing bath, the casing is dried and wound up on reels.

In carrying out this invention, a clear, regenerated cellulose sausage casing or a fibrous casing is continuously manufactured and dried, and then treated with a self-priming lacquer or coating composition to improve the moisture-vapor and oxygen impermeability thereof. The basic purpose of the Saran lacquer coating on the treated casing is to provide an oxygen and moisture barrier suitable for the processing of liverwurst in the casing. The thickness of the coating is not especially critical, provided that a continuous film of Saran is formed, and may be from a fraction of a mil to several mils in thickness. After the coating is applied and heat-dried, the sausage casing is wound on reels and finally cut to lengths suitable for stuffing with a meat emulsion such as a liverwurst stuffing.

A self-priming lacquer or coating composition for moisture and oxygen impermeable casing is produced by admixture of a Saran resin, a plasticizer, a polymeric polyisocyanate, preferably an activator such as a polyol or an ethoxy adduct thereof, and a solvent system. Such a one-coat coating composition containing a polymeric polyisocyanate is not only desirable but is definitely preferred over a two-coat system involving an undercoating and an overcoating. Not only is it cheaper, but improved physical properties are readily apparent in the cured casing, less casing damage is encountered, and manufacturing time is reduced.

The proportions of the coating composition are not highly critical. The Saran is present in the amount of about 10% wt., although amounts in the range of 1–25% wt., more or less, may be used so long as enough is present to lay down a continuous film. The plasticizer is present in an amount sufficient to plasticize the Saran film. Sufficient polymeric polyisocyanate is used to produce good adhesion of the coating to the casing. Generally 0.5–30%, more or less, of the isocyanate, based on the saran, is sufficient. Likewise, a sufficient amount of the polyol activator is used to cross-link the polyisocyanate which does not react with the Saran or the surface of the casing. Generally 0.5–20% of the activator is sufficient. The surfactant is not used in all of the preferred coating compositions, but where used, 0.01–1.0% of the total composition is adequate.

The important thing is that the coating composition is applied uniformly in one step (as by dip-coating or spray-coating) to the surface of a regenerated cellulose tubing or other food packaging film material, and then cured by heating in air or by other suitable methods until tack-free to effect the binding of the coating to the surface of the regenerated cellulose tubing without adversely affecting the excellent barrier properties of the coating. The coating thickness and coating ingredients are controlled so as to provide a final product having the desired moisture-vapor permeablity.

In preparing the coating composition, as described above, a variety of equivalent materials may be used. The base resin may be any of the Saran resins forming a film of suitable moisture and oxygen impermeability. The term Saran, as used herein includes vinylidene chloride polymers, and copolymers of vinylidene chloride with other monomers such as vinyl chloride, acrylonitrile, methyl methacrylate, acrylate esters, etc. Copolymers of vinylidene chloride with other monomers are generally described in terms of the weight ratio of the monomer units in the copolymer.

Plasticizers used in the coating composition include any plasticizers for Saran that are compatible with the other ingredients of the composition, e.g. Santicizer-141 octyl diphenyl phosphate, and other esters.

Polymeric polyisocyanates used include polyurethane polyisocyanates (e.g. Marlon, Mondur, and Polybond isocyanates) and polyester isocyanates. These materials are polymeric urethanes or esters containing a plurality of isocyanate groups per molecule which are generally pendent from the polymer chain.

Activators (or cross-linking agents) used in the coating composition include polyols, and reaction products of polyols with ethylene oxide, propylene oxide, or butylene oxide, e.g. Actol 32–160 polyoxpropylene triol (M. W. >1000), Actol 31–56, Actol 33–46, and other members of the Actol triol series, polyethylene glycols, polypropylene glycols, polyglycerols, polypentaerythritols, etc.

Surfactants used in stabilizing the coating compositions include fatty esters of polyols, e.g. Span 20 sorbitan monolaurate, Span 25 sorbitan trilaurate, Span 40 sorbitan monopalmitate, Span 45 sorbitan tripalmitate, Span 60 sorbitan monostearate, Span 65 sorbitan tristerate, Span 80 sorbitan monooleate, and Span 85 sorbitan trioleate, and epoxidized fatty oils, e.g. Admex 710, Paraplex G–62 epoxidized bodied soya bean oil, Epoxol 9–5 epoxidized oil (a polyepoxide monomer) containing at least 9% oxirane oxygen and 5 reactive groups per molecule, Epoxol 7–4 an epoxidized soya bean oil containing at least 7% oxirane oxygen and 4 reactive groups per molecule, Unox Epoxide 206 (1-epoxyethyl-3,4-epoxycyclohexane), and Unox Epoxide 101 (3,4-epoxy-6-methylcyclohexyl-methyl-3,4-epoxy-6-methylcyclohexane-carboxylate).

The solvent system preferably include a high boiling solvent such as butyrolactone, and a low boiling solvent, preferably an active-hydrogen-free solvent which penetrates or bites into the cellulose casing surface, e.g. ethers, esters or ketones (free of hydroxy groups) such as methyl ethyl ketone, tetrahydrofuran, ethyl acetate, etc.

The nature and preparation of the coated regenerated cellulose food packaging film materials such as tubular sausage casings, of this invention, are best illustrated by the following non-limiting examples. In these examples parts or percentages are by weight unless otherwise stated.

EXAMPLE 1

A saran solution was prepared by mixing 220.5 lbs. of methylethyl ketone solvent, 27 lbs. of Dow Saran F–120 (80/20 vinylidene chloride-acrylonitrile copolymer, high D.P. with relatively small proportion of low D.P. copolymer present), 612 g. of Santicizer-141 plasticizer (octyl diphenyl phosphate), and 22.5 lbs of butyrolactone high boiling solvent. The above saran solution is heated with agitation to about 60° C., cooled and admixed with the following ingredients.

Next, a mixture of 10 lbs. of Marlon 403 polyester, 0.75 lb. of Marlon 383 (polyurethane polyisocyanate) and 20 lbs. of the saran solution prepared above was made up as a self-priming coating composition.

The coating composition was applied by dip-coating in some instances and spray-coating in others to the outer surface of heavy gage unreinforced regenerated cellulose casing, orange dyed opaque fibrous casing, and undyed fibrous casing and the casing films then heated in hot air at about 200° F. for about 45 sec., then at 250° F. for about 45 sec., then at 400–600° F. for about 3 sec. The final cure was effected in an infrared heater section.

The resulting saran coated casing was noted to have an improved burst strength, an improved adherence to ink, and improved glossiness, and an improved barrier property in regard to both water vapor and oxygen. It was noted that the saran lacquer was self-anchoring onto the celulose casing and did not peel upon stretching or upon immersion in boiling water.

EXAMPLE 2

The composition of Example 1 was employed to produce an orange dyed opaque fibrous casing as in the example, and liverwurst (liver sausage) was stuffed therein. It was onted upon storage that the liverwurst sausage was less susceptible to greening than the same sausage processed in a conventionally produced saran coated cellulose casing.

EXAMPLE 3

The coating composition of Example 1 was tested to determine its effective pot-life. In successive experiments, the polyester-polyisocyanate solution was prepared and the saran solution was prepared and the two allowed to stand for a given length of time, and then mixed. It was found that the polyester-polyisocyanate solution was controlling as to pot-life. A pot-life of at least 6 hours was determined as a requirement of the application of the coating composition prepared in accordance with this invention. It appears, therefore, that the admixed solutions must be freshly prepared prior to coating of the tubular cellulose sausage casing in accordance with this invention.

EXAMPLE 4

A coating solution was prepared as in Example 1 but omitting the polyester. A satisfactory adherent film was formed on the cellulose casing upon coating with the solution.

EXAMPLE 5

A coating composition was prepared as in Example 1 but omitting butyrolactone from the solvent system. It was noted, upon following the coating procedure of Exampe 1, that the methylethyl ketone solvent boiled away at such a rate that toward the end of the curing, valleys tended to form in the coating. The adhesion of the cured coating to the casing was poor upon immersion in hot water. It is for this reason that a high boiling solvent must be employed in the coating composition for satisfactory results.

EXAMPLE 6

Coating compositions are prepared as in Examples 1 and 4 in which Mondur CB–75 polyurethane polyisocyanate is substituted for the Marlon polyisocyanate. When these coating compositions are used in coating cellulose casings by the coating procedure of Example 1 satisfactory, adherent, oxygen- and moisture-impermeable coating films are obtained.

EXAMPLE 7

A coating composition is prepared as in Example 6 in which Polybond polyisocyanate GA–83–C is substituted for the Marlon polyisocyanate. When this coating composition is used in coating cellulose casings by the coating procedure of Example 1 satisfactory, adherent, oxygen- and moisture-impermeable coating films are obtained.

EXAMPLE 8

A pre-mix of 1.2 parts Span 85 (sorbitan trioleate), 4.8 parts Actol 32–160 (polyoxypropylenetriol M.W. >1000) and 20.0 parts tetrahydrofuran was made up and added to 100 parts Marlon 383 polyurethane polyisocyanate (60% solids). The admixture was then added to 2400 parts of the 10% saran solution of Example 1. The final mix (containing about 20% polyisocyanate based on total solids) was dip-coated onto orange dyed opaque fibrous casing and cured as in Example 1. The adhesion of the coating to the casing when immersed in hot water was better than the coating of Example 5.

EXAMPLE 9

A pre-mix of 2.4 g. of Span 85, 9.6 g. of Actol 32–160, and 400 ml. of tetrahydrofuran was made up and added to 6000 g. (6850 ml.) of the saran solution of Example 1. 200 g. of Mondur CB–75 polyurethane polyisocyanate was then added to the admixture. This coating composition was used to coat orange dyed opaque fibrous casing as in Example 1.

The oxygen transmission rate of the saran coated casing was 0.165 cc./100 in.$^2$/24 hr.-atm. The water vapor transmission rate was 0.156 cc./100 in.$^2$/24 hr.-atm. The maximum acceptable oxygen- and water vapor transmission rates are in the range from 0.6-1.0 cc./100 in.$^2$/24 hr.-atm. for saran coated casings prepared by undercoating with a polyisocyanate and then coating with a saran lacquer.

The saran coated casing was used in the production of liverwurst and Braunschweiger sausages. The development of greening in the sausage was not noticeable until at least three weeks after stuffing. In casings coated with saran by a two-coat method (polyisocyanate undercoat followed by coating with a saran lacquer) some greening was observed after two weeks.

EXAMPLE 10

A pre-mix of 0.3 g. of Span 85, 1.2 g. of Actol 32–160 and 5 ml. of tetrahydrofuran was made up and added to 25 g. of Mondur CB–75 polyurethane polyisocyanate. The admixture was then added to 6900 ml. of the saran solution of Example 1. The coating composition was used to coat dyed fibrous casing as in Example 1.

The oxygen transmission rate of the saran coated casing was 0.0956 cc./100 in.$^2$/24 hr.-atm. The water vapor transmission rate was 0.00852 cc./100 in.$^2$/24 hr.-atm. The maximum acceptable oxygen- and water vapor transmission rates are in the range from 0.6–1.0 cc./100 in.$^2$/24 hr.-atm. for saran coated casings prepared by undercoating with a polyisocyanate and then coating with a saran lacquer.

The saran coated casing was used in the production of liverwurst and Braunschweiger sausages. The development of greening in the sausage was not noticeable until at least three weeks after stuffing. In casings coated with saran by a two-coat method (polyisocyanate undercoat followed by coating with a saran lacquer) some greening was observed after two weeks.

EXAMPLE 11

A pre-mix of 0.7 g. of Span 85, 2.8 g. of Actol 32–160 and 12 ml. of tetrahydrofuran was made up and added to 85 g. of Mondur CB–75 polyurethane polyisocyanate. The admixture was then added to 6580 ml. of the saran solution of Example 1. The coating composition was used to coat dyed fibrous casing as in Example 1.

The oxygen transmission rate of the saran coated casing was 0.143 cc./100 in.$^2$/24 hr.-atm. The water vapor transmission rate was 0.0130 cc./100 in.²/24 hr.-atm. The maximum acceptable oxygen- and water vapor transmission rates are in the range from 0.6–1.0 cc./100 in.²/24 hr.-atm. for saran coated casings prepared by undercoating with a polyisocyanate and then coating with a saran lacquer.

The saran coated casing was used in the production of liverwurst and Braunschweiger sausages. The development of greening in the sausage was not noticeable until at least three weeks after stuffing. In casings coated with saran by a two-coat method (polyisocyanate undercoat followed by coating with a saran lacquer) some greening was observed after two weeks.

While this invention has been described fully and completely with special emphasis upon several preferred embodiments, it is to be understood that within the scope of the appended claims this invention may be practiced otherwise than as specifically described herein.

What is claimed is:

1. A tubular food casing of regenerated cellulose or fiber-reinforced regenerated cellulose having a coating on the outer surface thereof formed by in situ reaction of a mixture of a saran, a polymeric polyisocyanate, and a polyol activator after coating on said surface, said coating being tenaciously adherent to said surface and having oxygen- and water vapor transmission rates less than about 1.0 cc./100 in.²/24 hr.-atm.

2. A method of preparing an oxygen- and water vapor impermeable food casing which comprises applying to the outer surface of a regenerated cellulose or fiber reinforced regenerated cellulose food casing a thin coating of a coating composition of unreacted components comprising a saran resin and a polymeric polyisocyanate in a solvent system including a polyol activator, and heating the coated casing to dry and cure the coating thereon to form an adherent film coating having oxygen- and water vapor transmission rates less than about 1.0 cc./100 in.²/24 hr.-atm.

3. A method in accordance with claim 2 in which said coating solvent system includes a high boiling solvent.

4. A method in accordance with claim 3 in which said high boiling solvent is butyrolactone.

5. A method in accordance with claim 3 in which said coating solvent system includes an active, low boiling, active-hydrogen-free solvent.

6. A method in accordance with claim 5 in which said low boiling solvent is an ether, ester, or ketone.

7. A method in accordance with claim 6 in which said low boiling solvent is tetrahydrofuran, ethyl acetate, or methyl ethyl ketone.

8. A method in accordance with claim 2 in which said polyol activator is a polyol or a reaction product of a polyol with ethylene oxide, propylene oxide, or butylene oxide.

9. A method in accordance with claim 8 in which said coating composition includes a fatty ester of a polyol or an epoxidized fatty oil, as a surfactant and stabilizer.

References Cited

UNITED STATES PATENTS

| | | | |
|---|---|---|---|
| 3,316,189 | 4/1967 | Adams | 117—145 |
| 3,444,266 | 5/1969 | Reischl et al. | 117—145 |
| 3,607,519 | 9/1971 | Beyer | 156—192 |

OTHER REFERENCES

Condensed Chemical Dictionary, 6th ed., New York, Reinhold, 1961, pp. 191 and 1005.

WILLIAM D. MARTIN, Primary Examiner

J. A. BELL, Assistant Examiner

U.S. Cl. X.R.

117—94, 119.6, 161 KP, 161 UN, 161 UZ